Patented May 9, 1950

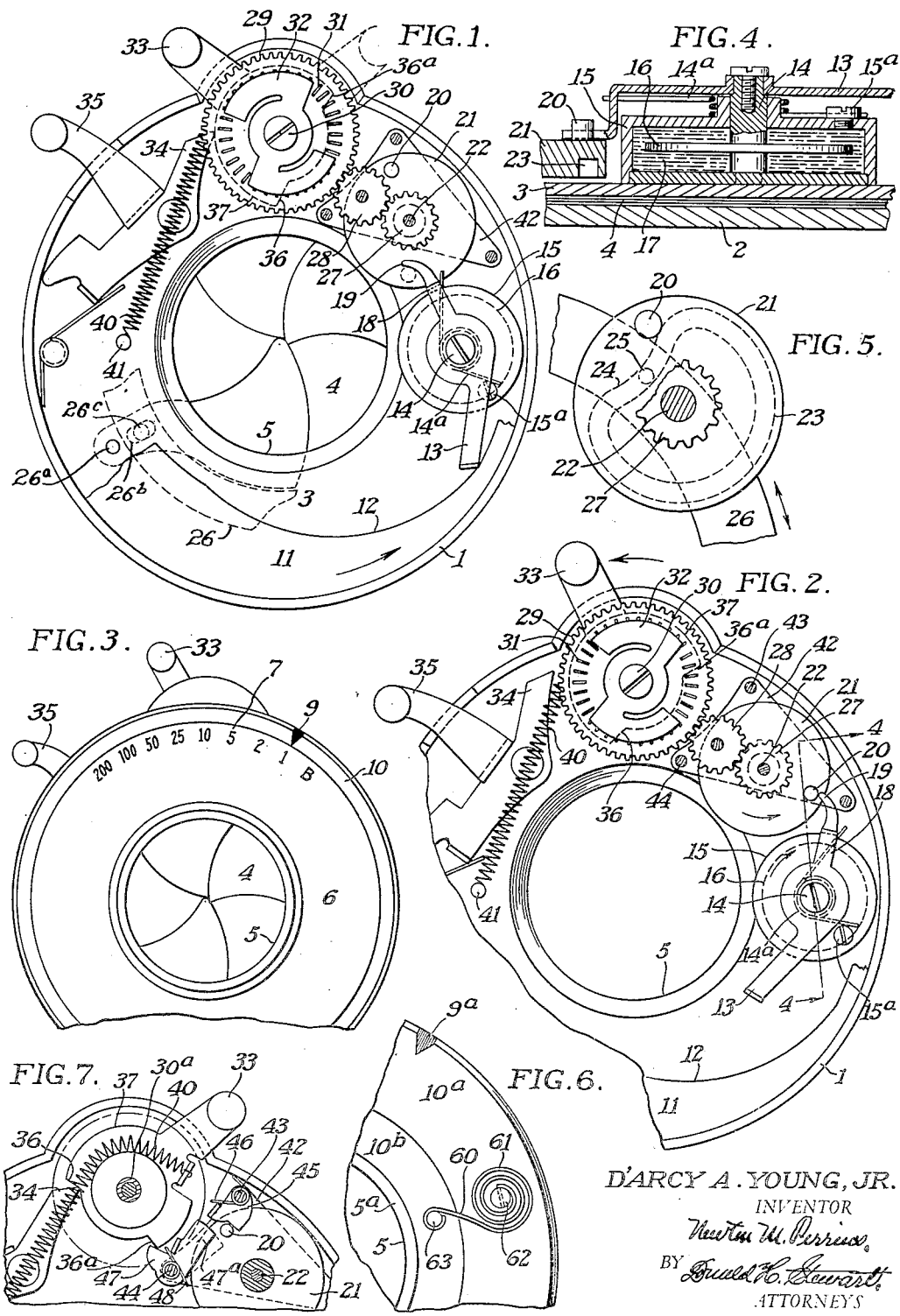

2,507,182

UNITED STATES PATENT OFFICE 2,507,182

VISCOUS FLUID SHUTTER RETARD MECHANISM

D'Arcy A. Young, Jr., Rochester, N. Y., assignor to Eastman Kodak Company, Rochester, N. Y., a corporation of New Jersey Application April 26, 1947, Serial No. 744,192

2 Claims. (Cl. 95—63)

This invention relates to camera shutters, and particularly to simple mechanism for governing so-called "slow" automatic shutter speeds, such as 1/25 second to 1 second.

In camera shutters as generaly constructed, the "retard" mechanism, which comprises mechanical means for producing exposures in the above-mentioned time category, is frequently complicated, expensive to make, assemble and adjust, and includes many parts subject to derangement through wear.

It is an object of the present invention to reduce the number of parts and the dimensional tolerances of a shutter retard mechanism to a minimum, while retaining dependable timing and rugged construction. To this end, the primary element of the preferred embodiment of the present invention consists of a simple plate rotatable in a viscous fluid within a closed chamber, or reservoir, whereby, when the plate is permitted to have a variable rotary movement, the drag or molecular friction of the fluid thereon may cause it to complete its movement within a given time interval.

I am aware that shutter retard mechanisms have been devised wherein an air-filled dashpot is the principal mechanical retard element. Shutters have also been proposed in which a hydraulic cylinder with a controlled escape port is used to accomplish the required timing. Usually these structures are complicated and require troublesome ports or valves.

I have found that it is very difficult to define the requirements of viscous or greasy materials best suited for my improved retard. It does not depend on viscosity alone but rather on what might be termed "shear strength" of the viscous, grease-like fluid. Thus, in two greases of the same viscosity, one may apparently shear easily, where the other may appear to have a "rubbery" effect" in that the grease appears to hold onto a moving member and spring back when it releases. The first type is desirable for my purpose and the second type is undesirable. The viscous material should wet the disk and reservoir well. The viscous material should be affected as little as possible by changes in temperature. One example of a suitable viscous material is Dow-Corning grease, D. C. 194, made by Dow-Corning Corporation, Midland, Michigan. This is a silicone resin containing grease which fulfills the above requirements as it is relatively insensitive to changes in temperature and has other desirable properties among which is that it retards smoothly, and yet there is little or no tendency for the grease to leak out around bearings.

The physical properties of the Dow-Corning silicone grease, D. C. 194, above referred to are as follows:

Worked Penetrometer (A. S. T. M. D-217-44T) _____ 200–250
Flash point (A. S. T. M. D-92–33) _____ 550° F.
Dropping point (A. S. T. M. D-566-42) _____ 392° F.
Bleeding (A. N. G. 34 specification) _____ 16 hrs. at 230° F.

The worked penetrometer, the flash point, and the dropping point were all measured in accordance with "American Standard Test Materials Requirements." The bleeding was measured in accordance with "Army-Navy Government Specifications." Reference may be had to "Chemical Industries" for March 1945, page 428, for "Synthesis of silicones" which shows how the transformation of basic raw materials—sand, brine, coal, and oil—into silicone resins is produced.

A complete understanding of the invention by those skilled in camera shutter design and operation may be acquired from the following description together with the accompanying drawings, in which like reference characters denote like parts throughout, and in which:

Fig. 1 is a front view of a camera shutter with the outer face plates removed, in normal or tripped position, and including a showing of a preferred form of this invention;

Fig. 2 is a similar view, the shutter blades being fully opened and about to close after a "retarded" exposure;

Fig. 3 is an outside front view of a shutter on a reduced scale;

Fig. 4 is a transverse section through the retard mechanism showing the disc and fluid aforesaid, taken approximately on line 4—4 of Fig. 2;

Fig. 5 is an enlarged front view of a detail;

Fig. 6 is a fragmentary front view of a modification embodying a temperature compensator; and Fig. 7 is a fragmentary view of the setting lever and some adjacent parts.

The invention may be conveniently incorporated in a conventional type of camera shutter having a circular casing with an upstanding rim 1, a flat back 2, a mechanism plate 3 spaced from the back to provide operating space for a plurality of blades 4 operable to cover and to uncover an exposure aperture 5 within which a lens, not shown, may be mounted in a known manner. As illustrated in Fig. 3, the shutter may have a fixed indicia plate 6 bearing characters 7 denoting speeds. A fiducial mark 9 on a collar 10 permits the operator to set the shutter for any speed on scale 7 by turning the collar 10 until mark 9 is aligned with the desired character.

Within the shutter casing and attached to the collar 10 is a speed-control member 11, having a cam edge 12 which, when collar 10 is rotated counter-clockwise, bears against an arm 13 of a "retard" lever pivoted at 14. This pivot is mounted at the center of a circular chamber, or reservoir, 15 which is fixed to the mechanism plate 3, and a plate or disc 16 fixed to the pivot 14 rotates through whatever part of a circle the arm 13 traverses in its movement, as will be further made clear. The plate 16 is here shown as being round, but it may be of any desirable shape such as long and narrow, if desired. The viscous fluid 17 hereinbefore mentioned preferably fills the chamber 15 completely, so that disc 16 is constantly immersed, and the retardant qualities of the fluid are preferably such that the disc cannot turn freely in any direction, but is inhibited and "dragged" by the fluid. The chamber 15 may have a filler plug 15a.

An arm 18 which is part of the retard lever extends from pivot 14 substantially opposite arm 13, and has a prong-like end 19 that is adapted to be engaged and moved by a pin 20 in a disc 21, the latter being pivoted at 22. A spring 14a resists this movement and tends to return the lever to normal position, by its reaction against plug 15a. The rear face of this disc carries a groove having a "high" portion 23 and a "low" portion 24, both constituting a cam. A pin 25 engaging the groove is set in a blade-operating ring 26 to which the blades 4 are pivotally connected at 26a to the shutter casing in a conventional manner. The blades are slotted at 26b to turn on pivots 26c in a known manner in the art. It will be understood that an oscillating movement of pin 25 from the position of Fig. 5 to the left and then to the right, back to the position of Fig. 5 again during one revolution of disc 21, will result in an exposure by swinging the blades 4 to open and then to closed position.

One means for accomplishing one revolution of the disc 21 each time the shutter is tripped comprises, in the present form of the invention, a pinion 27 fixed to the disc and meshing with another pinion 28 of similar size, this latter being an idler connecting pinion 27 with a master gear 29, rotatable on a pivot 30. The gear 29 has ratchet teeth 31 on its front face, and a double-ended pawl 32 is fixed to a sleeve 30a on the pivot 30 as is also the setting lever 33, so that when the latter is moved clockwise, to the "set" position indicated by broken lines in Fig. 1, the pawl 32 moves with it and is then ready to drive the gear 29 counter-clockwise when it is released by a dog 34 that is part of the release member or trigger 35. The dog 34 engages a tooth shown at 36 which is in the periphery of a disc 37 also fixed to the setting lever 33.

Means are provided to prevent gear 29 from rotating clockwise, and also to prevent disc 21 from rotating either clockwise or counter-clockwise until the trigger 35 is depressed. The parts constituting such means are shown in Fig. 7 and are omitted from Figs. 1 and 2 to permit ready understanding of their functions.

The pinions 27, 28 are set in a frame 42 with corner posts 43, 44 which serve as pivots for a detent 45, urged counter-clockwise by a spring 46, and a second detent 47, urged clockwise by a spring 48. The lugs against which these springs bear serve to limit the swing of the detents by striking the frame 42.

As lever 33 is moved clockwise from the position of Fig. 1, pawl 32 clicks over ratchet teeth 31 on gear 29. The latter then cannot turn clockwise with lever 33, because pin 20 on disc 21 is blocked by detent 45. When lever 33 reaches its fully-set position and is held by dog 34 from moving counterclockwise, a second tooth 36a strikes detent 47 and swings it out of the circular path of pin 20. Upon the release of disc 37, as dog 34 is disengaged from tooth 36, spring 40 instantly turns the setting lever 33 counter-clockwise, and pin 20 through gear 29 and pinions 28 and 27 move past arm 47a on detent 47 before the arm can intercept it, and the shutter may then be opened and closed by the rotation of disc 21, as hereinbefore described. As disc 21 nearly completes its one revolution, pin 20 pushes detent 45 aside and stops against the end of arm 47a. Detent 45 immediately snaps down behind pin 20, and the latter is thus barred from rotation in either direction until the shutter is again set by moving lever 33 to the position of Fig. 7. Because of this arrangement, the shutter is unlikely to be accidentally opened.

A power element consisting of a coiled spring 40, anchored at 41 and having its upper end attached to the disc 37, is tensioned as the lever 33 is moved clockwise to set position. When the trigger 35 is depressed, disengaging the dog 34, spring 40 turns disc 37 counter-clockwise and pawl 32 drives gear 29 through a circular path sufficient to cause pinion 27 to make one complete revolution and thereby open and close the blades 4.

If the mark 9 is set at "1", the cam portion 12 of the speed-control member 11 will not interfere with the swinging movement of arm 13 and, therefore, as pin 20 moves counterclockwise from the position of Fig. 1, it strikes the prong 19 and carries it toward the right, or clockwise about pivot 14, against the torque of spring 14. However, this movement is retarded by the reluctance of disc 16 to turn, due to the viscosity of fluid 17 in which it is completely immersed. The parts are so proportioned that the blades open while pin 20 is moving from its full-line position in Fig. 1 to the broken-line position where it first meets prong 19. The blades 4 therefore remain in open position until the pin 20 moves lever 18 to the position of Fig. 2, in which it is about to slip off from the prong 19 and will then be free to complete its revolution and return to the position of Fig. 1, permitting the blades 4 to be closed by spring 40.

If the mark 9 is set at "25" an exposure of 1/25 second will result, because then the cam portion 12 will have forced the arm 14 so far inwardly that prong 19 will be moved by pin 20 only a fraction of its possible travel. If the speed collar 10 is moved to bring mark 9 to any character between 25 and 1, the shutter speed will be in accordance with such setting, as the cam 12 then permits a proportionate travel of arms 14 and 18, and a corresponding partial rotation of disc 16.

It has been found that at extremely low temperatures a fluid in chamber 15 that may be fully satisfactory in a normal range will so change in its viscosity and flow characteristics that the operation of the retard mechanism may become unreliable and erratic. If it is necessary to provide for such conditions a temperature compensator may be added, as shown in Fig. 6, which in its elemental form may comprise a bimetallic strip 60, coiled helically at 61 about a pin 62 in the control collar 10$^a$. This collar is frictionally held, that is, it cannot rotate and carry the fiducial mark 9$^a$ around the scale until an appreciable manual application of effort is applied, whereas the inner collar 10$^b$ on which the collar 10$^a$ rides, may rotate freely on the central aperture rim 5$^a$. The "free" end of the strip 60 may be hooked to a pin in the collar 10$^b$. With such a construction, a drop in temperature below a predetermined point causes the bimetallic coil 61 to tighten up, exerting a counter-clockwise force upon the collar 10$^b$ and thus displacing it from its normal relation to collar 10$^a$. The net result of this movement causes the cam 12 (part of collar 10$^b$ in this instance) to move to a position which will require lever 18 to travel through a shorter arc before it slips off pin 20 than would be required at a normal temperature, so that the speed indicated by the character on scale 7 with which mark 9$^a$ is aligned will still be correct. Conversely, a too-high temperature would cause coil 61 to relax, and collar 10$^b$ would then advance clockwise relatively to collar 10$^a$, causing lever 18 to travel farther. The temperature compensator thus permits the retard mechanism to complete its function in the actual indicated time, regardless of the prevailing temperature.

It will be obvious to shutter designers and skilled instrument makers that numerous variations from the actual construction above described and illustrated by be devised and still embody the actual invention in its proper scope. These variations are intended to include shutter retard mechanisms in which a disc or like member is rotated in a viscous fluid, combined with operating and control members, and falling within the terminology of the following claims.

I claim:

1. A retarding device for use in a camera shutter of the type including an apertured casing, pivotally mounted shutter leaves for opening and closing the shutter aperture, blade-operating mechanism for operating the shutter blades including a blade ring, operable connections between the blade ring and blades, a spring, driving connections between the spring and blade ring and a movable protuberance carried by one of the driving connections and having a path of movement, said retarding comprising a reservoir, a shaft passing through the reservoir and supported in bearings therein, a disk fixedly attached to the shaft inside the reservoir and an arm fixedly attached to the shaft outside the reservoir and extending into the path of movement of the protuberance, and a flowable, viscous, silicone grease in the reservoir contacting with the disk to retard movement thereof when the arm is moved by the protuberance, said silicone grease having substantially the following properties:

Worked penetrometer (A. S. T. M. D–217–44T) _____ 200–250
Flash point (A. S. T. M. D–92–33) _____ 550° F.
Dropping point (A. S. T. M. D–566–42) _____ 392° F.
Bleeding (A. N. G. 34 specification) _____ 16 hrs. at 230° F.

where A. S. T. M. refers to American Standard Test Materials requirements and A. N. G. refers to Army-Navy Government specifications.

2. A retarding device for use in a camera shutter of the type including an apertured casing, pivotally mounted shutter leaves for opening and closing the shutter aperture, blade-operating mechanism for operating the shutter blades including a blade ring, operable connections between the blade ring and blades, a spring, driving connections between the spring and blade ring and a movable protuberance carried by one of the driving connections and having a path of movement, said retarding comprising a reservoir, a shaft passing through the reservoir and supported in bearings therein, a disk fixedly attached to the shaft inside the reservoir and an arm fixedly attached to the shaft outside the reservoir and extending into the path of movement of the protuberance, a spring tending to turn the arm against the resistance of the silicone grease and into the path of movement of the protuberance, and a flowable viscous silicone grease in the reservoir contacting with the disk to retard movement thereof when the arm is moved by the protuberance, said silicone grease having substantially the following properties:

Worked penetrometer (A. S. T. M. D–217–44T) _____ 200–250
Flash point (A. S. T. M. D–92–33) _____ 550° F.
Dropping point (A. S. T. M. D–566–42) _____ 392° F.
Bleeding (A. N. G. 34 specification) _____ 16 hrs. at 230° F.

where A. S. T. M. refers to American Standard Test Materials requirements and A. N. G. refers to Army-Navy Government specifications.

D'ARCY A. YOUNG, Jr.

REFERENCES CITED

The following references are of record in the file of this patent:

UNITED STATES PATENTS

| Number | Name | Date |
|---|---|---|
| 1,058,290 | Corey | Apr. 8, 1913 |
| 1,250,354 | Ricketts | Dec. 18, 1917 |
| 1,341,823 | Riddell et al. | June 1, 1920 |
| 1,407,320 | Bouche | Feb. 21, 1922 |
| 1,626,032 | Fairchild | Apr. 26, 1927 |
| 2,234,437 | Kistler | Mar. 11, 1941 |
| 2,326,077 | Steiner | Aug. 3, 1943 |
| 2,339,810 | Richards | Jan. 25, 1944 |
| 2,343,347 | Turner | Mar. 7, 1944 |